United States Patent [19]
Brown

[11] Patent Number: 5,466,009
[45] Date of Patent: Nov. 14, 1995

[54] FLIP-FLOP FLOAT CHART

[76] Inventor: James L. Brown, 31971 County Rte. 4, Cape Vincent, N.Y. 13618

[21] Appl. No.: 76,952

[22] Filed: Apr. 5, 1993

[51] Int. Cl.[6] .................................................. G09B 29/00
[52] U.S. Cl. ........................... 283/34; 283/35; 40/904
[58] Field of Search .............................. 283/34, 35, 42, 283/43; 434/130, 150, 153; 40/904

[56] References Cited

U.S. PATENT DOCUMENTS 4,934,741 6/1990 Landry et al. ............................ 283/34
5,207,457 5/1993 Haynes ..................................... 283/34

Primary Examiner—Willmon Fridie

[57] ABSTRACT

This invention is a new designed configuration of a laminated folding navigation chart. This said chart is intended for pilots and navigators of small planes and watercraft. This said navigation chart consists of a plurality of (preferably 10) panels that are flexibly coupled together at their contiguous edges. The said transparent flexible couplings herein described allow epicycle multiplicity folding of said panels relative to each other. This said epicycle multiplicity folding of panels allows the chart to be viewed clearly while in the fully open position, partial open position or in a single panel closed position.

11 Claims, 4 Drawing Sheets

FLIP-FLOP FLOAT CHART

BACKGROUND OF THE INVENTION

1. Field of the Invention

The invention relates to navigation charts wherein the said chart suitable for piloting appears on a plurality (preferably ten) panels. The panels consist of individual laminated rectangular indicia carriers relatively stiff. These said panels are flexibly coupled at their contiguous parallel edges so as to allow complete movement approximately 360° relative to each other. This transparent flexible coupling allows epicycle multiplicity movements relative to each other. In addition the indicia carrier panels are easily observable in the full open position, partial open position, or single panel closed position.

2. Description of Related Art

Piloting is commonly defined as navigating a craft in optical or electronic sight of land. Electronic sight can include the use of RADAR equipment to identify objects on land. The position of the craft in the air or on the water is calculated by a navigational method known as triangulation. Triangulation consists of obtaining a magnetic compass or gyrocompass bearing of an optical or electronic line of sight from the small craft to two or more specific landmarks on land. The landmarks are identified on a chart of land and lines are drawn on the chart from the representations of the objects at angles corresponding to the angles of the lines of sight. The point of intersection of the lines drawn on the chart is the navigational position or "fix" of the small craft.

Piloting charts present sufficient detail of land to represent specific landmarks that can be recognized from an airplane or a vessel on the water and in sight of land depicted by the chart. Piloting charts of this nature are too large and cumbersome for use on a small plane or craft that has no chart table. Piloting charts, because of their size, must often be folded in order to be handled on a small plane or craft. If the chart is carried in a waterproof chart pocket, folding the chart by removing the chart from the pocket exposes the chart to the elements. If the chart is folded along with the chart pocket, the chart pocket can be permanently creased or destroyed.

It is also common with navigational charts, and the like, to roll the large chart into a relative configuration for storage. As is well known the unrolling, viewing, and rerolling of navigational charts is extremely difficult, cumbersome, frustrating, and can be dangerous for small plane or watercraft navigation. See Exhibit 4, herein contained on page 20.

While it is known to laminate paper documents between transparent sheets of film to protect the document, laminated folding navigation charts are not common. The use of the film will stiffen the navigation chart resisting rolling and folding and larger laminated charts are not commonly employed in small planes and craft navigation wherein the document is routinely handled.

Special folio type charts, known as small craft charts are published for areas that have a significant amount of small craft traffic. These charts have several fold-out segments stapled together in protective covers, along with tidal and harbor facility information. These charts are considered easier to use in a confined cockpit in a skiff or daysailer than are the large format navigational charts used on larger vessels. The user of these charts can obtain navigational information by flipping through charts printed on small sheets of paper and attached together in a "book" format. The user of small craft charts cannot obtain a "total picture" without disassembling the charts from one another and fitting them together. A "book" format as used in small craft charts does not lend itself to navigational plotting because sight lines from a landmark often cross over onto another chart.

While it is recently known and acknowledged that large charts, maps, or indicia carriers could be laminated in panels and each of these panels could be hingedly connected to comprise a complete folding indicia carrier, it is not known that a hingedly connection for a navigation chart is generally accepted or is currently in common use. Refer to photograph exhibits 1, 2, 3, and 5 of the working model of this invention which show a laminated flexible coupled folding navigation chart on pages 17, 18, 19, and 21 respectively.

SUMMARY OF THE INVENTION

This invention is a new designed configuration of a laminated folding navigation chart intended for pilots and navigators of small planes and watercraft. This navigation chart consists of a plurality of individually laminated rectangular parallel panels relatively stiff (preferably ten) hingedly connected and easily pivotal relative to each other. This hinged connection consists of a flexible transparent coupling relatively flat that allows epicycle, multiplicity folding of all panels relative to each other.

In this manner any of the identically rectangular dimensioned panels may be easily folded as to be visually observed while the configuration is of a fully or partially open or of a closed single panel size.

Yet another object of the invention is to provide a laminated folding navigational chart, divided into a plurality of readily observable smaller panels having images of indicia on both sides thereof, wherein the chart appears on individually laminated rectangular parallel panels relatively stiff (preferably ten) hingedly connected and easily pivotal relative to each other with all of the indicia visible.

Yet another object of the invention is to provide a laminated folding navigational chart permitting a large scale chart to be divided into a plurality of readily observable smaller panels wherein the panels may be readily marked and erased without damage to the chart and where superior durability of the chart is achieved providing an extended usable life.

In the practice of this invention an indicia carrier such as a navigational chart, commonly printed upon a paper medium, is sectioned into a plurality of panels and then individually laminated, said panels are placed in a precise parallel assembly fixture, and flexibly coupled with a common packaging transparent strapping tape, said chart is dusted with a talcum powder applied to the exposed tape to neutralize the adhesive in order to provide freedom of said panel movement, said flexible couplings allows panels to be folded over either face of the associated panels wherein the hinged panels are capable of approximately 360 degrees pivotal movement relative to each other. This said transparent flexible coupling allows epicycle multiplicity parallel folding of panels which allows the chart to be viewed clearly while in the fully open position, partial open position or in a single panel closed position.

This said transparent flexible coupling being only a few thousandth of an inch thick provides the strength, durability, and alignment necessary for the successful repeated folding of said navigation charts.

Preferably 10 rectangular individual panels are used which are of identical size and each includes lateral side edges and end edges. The two center panels in FIG. 1 have two end panels and two intermediate panels hingedly connected to their lateral edges and upper and lower edges of said panels on both sides of the center panels. All 10 panels are hingedly connected approximately parallel to each other and reinforced at the junctions of the contiguous edges.

By laminating the indicia carrier sections in the described manner and hingedly connecting the panels such that the end panels are capable of folding upon either side of the associated adjoining panel, a universal folding chart can be readily achieved to permit any panel to be in a fully observable position even though the chart is folded to its most concise configuration. Because of the relatively large size of the navigational chart and their relative stiffness, and the ability of the panels to easily hinge and fold in either direction, the confusion and frustrations previously employed with rolling navigational charts is eliminated.

This invention the Flip-Flop-Float Chart is presented as a practical, working chart for the novice, pilot or navigator of small planes or crafts. It is capable of repetitive folding operations during inclement or fair weather. The necessary keys to this operation are sustained precise parallel alignment of all panels, hinged connections capable of considerable abuse without failure, and waterproof operation. The flexible material of this chart is relatively stiff, waterproof and an indicia carrier with an approximate specific gravity less than the specific gravity of water which allows flotation of said chart. This chart requires no memory to open or close.

BRIEF DESCRIPTION OF THE DRAWINGS

The aforementioned objects and advantages of the invention will be appreciated from the following description and accompanying drawing wherein.

DESCRIPTION OF THE PREFERRED EMBODIMENTS

Figure 1:
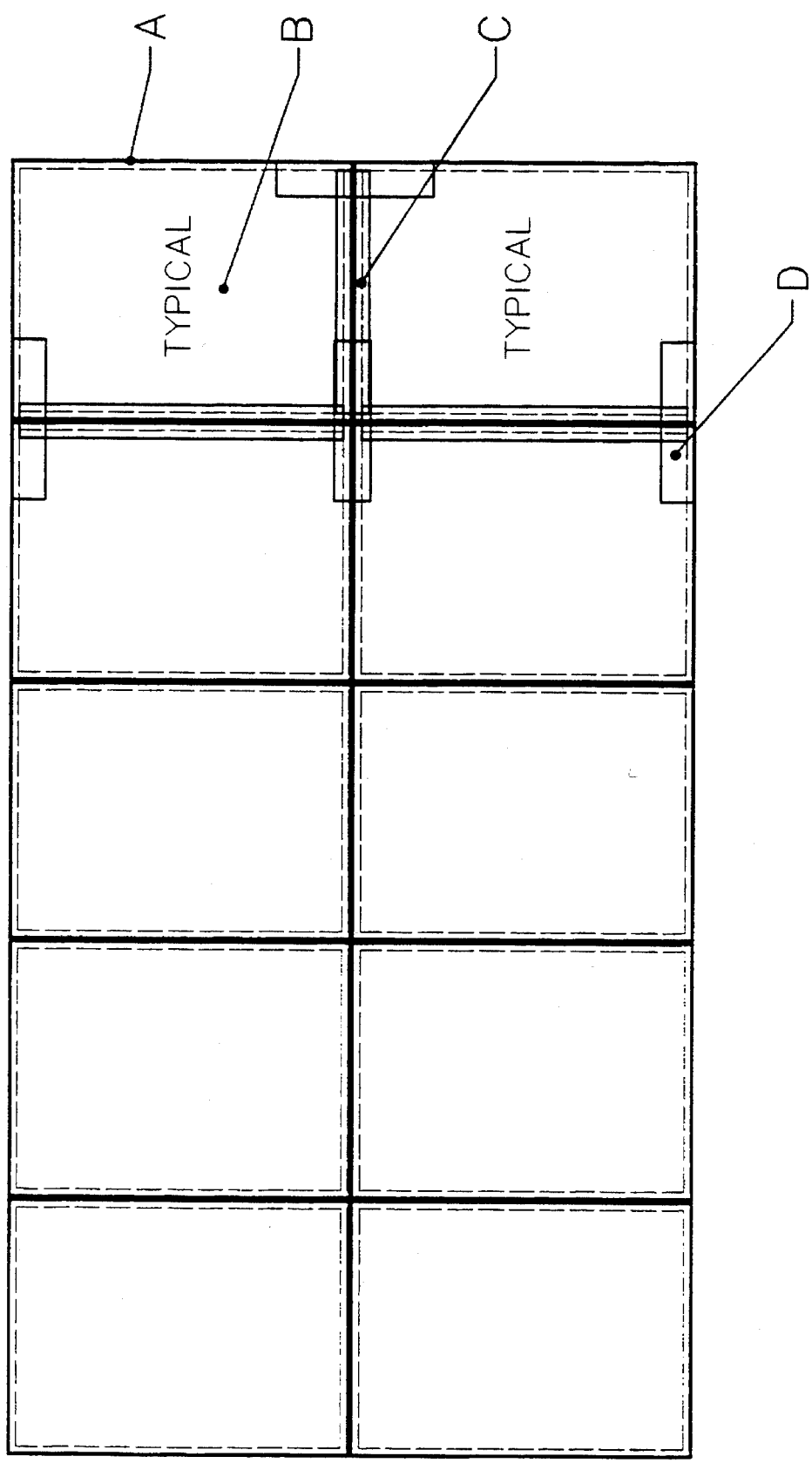
FIG. 1 is a front view of the laminated folding chart in accord with the invention. The chart illustrates a typical flexible transparent coupling and said chart shown in its fully unfolded condition.
Figure 2:
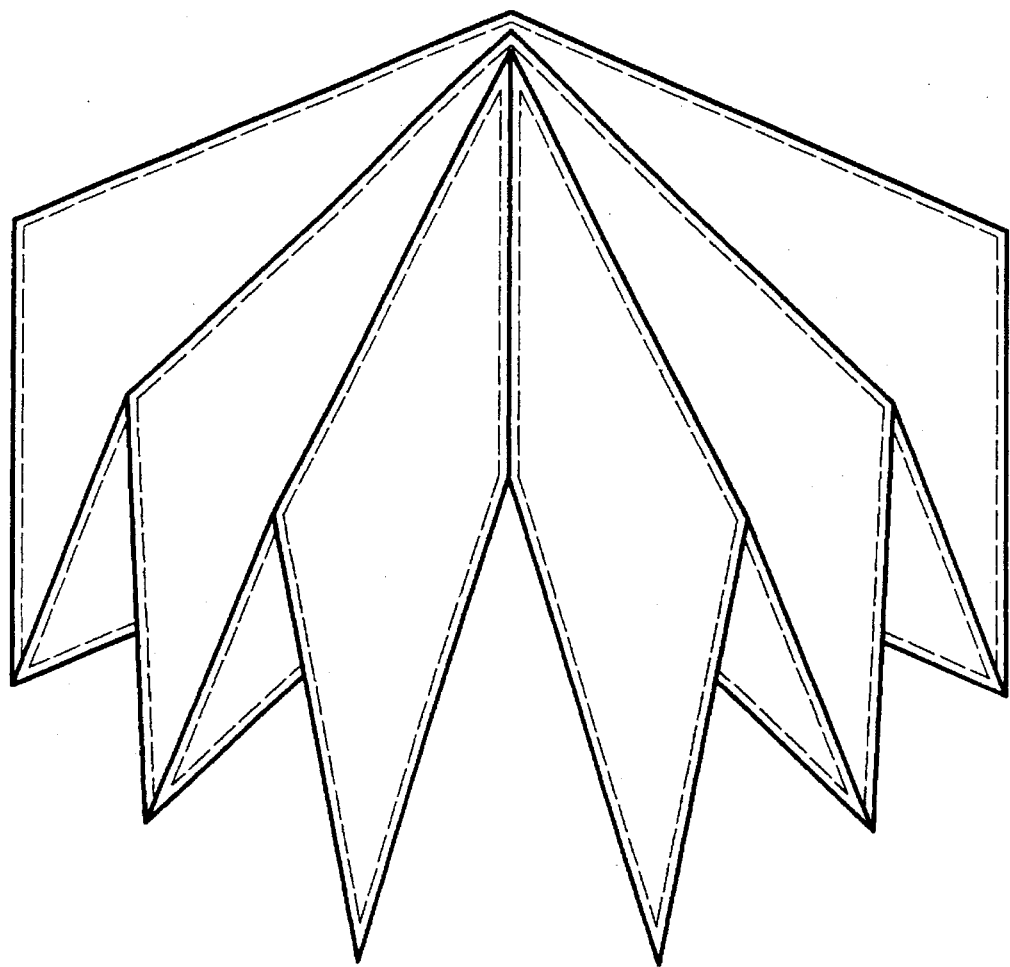
FIG. 2 is an end view of the laminated chart illustrating one orientation of the panels when approximately fully folded.
Figure 3:
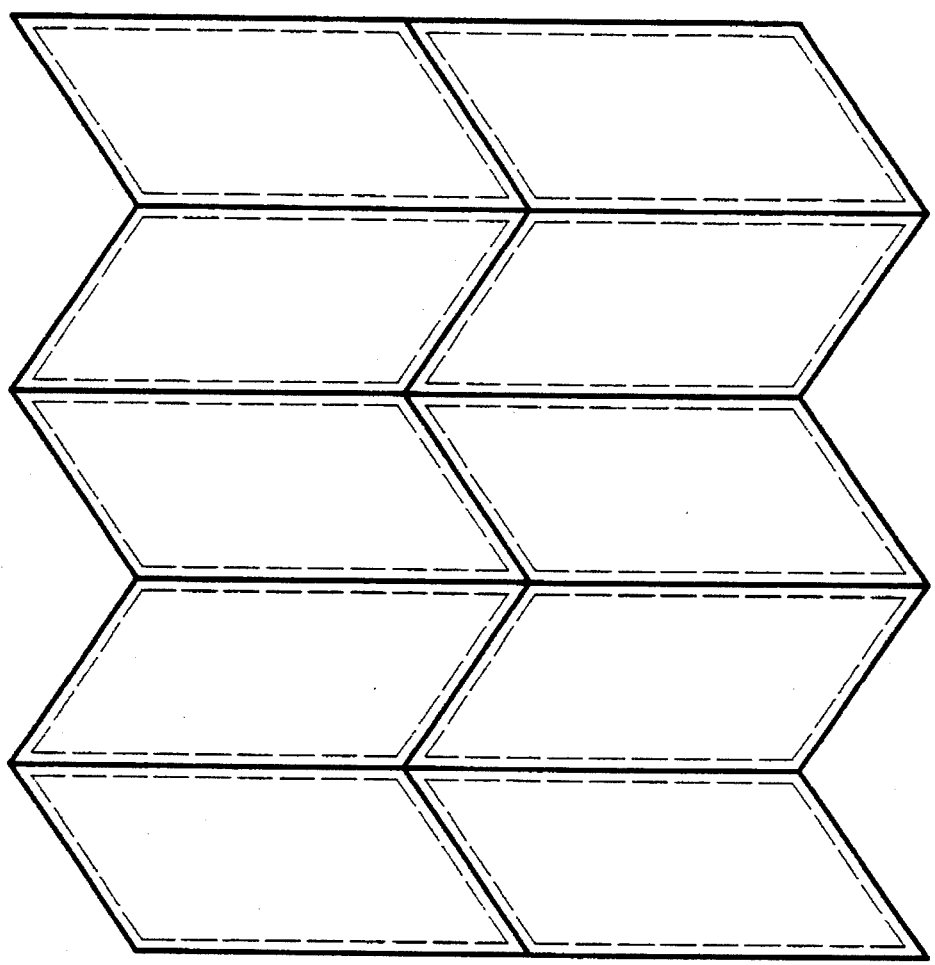
FIG. 3 is a front view when approximately fully open illustrating another manner in which the chart may be folded.
Figure 4:
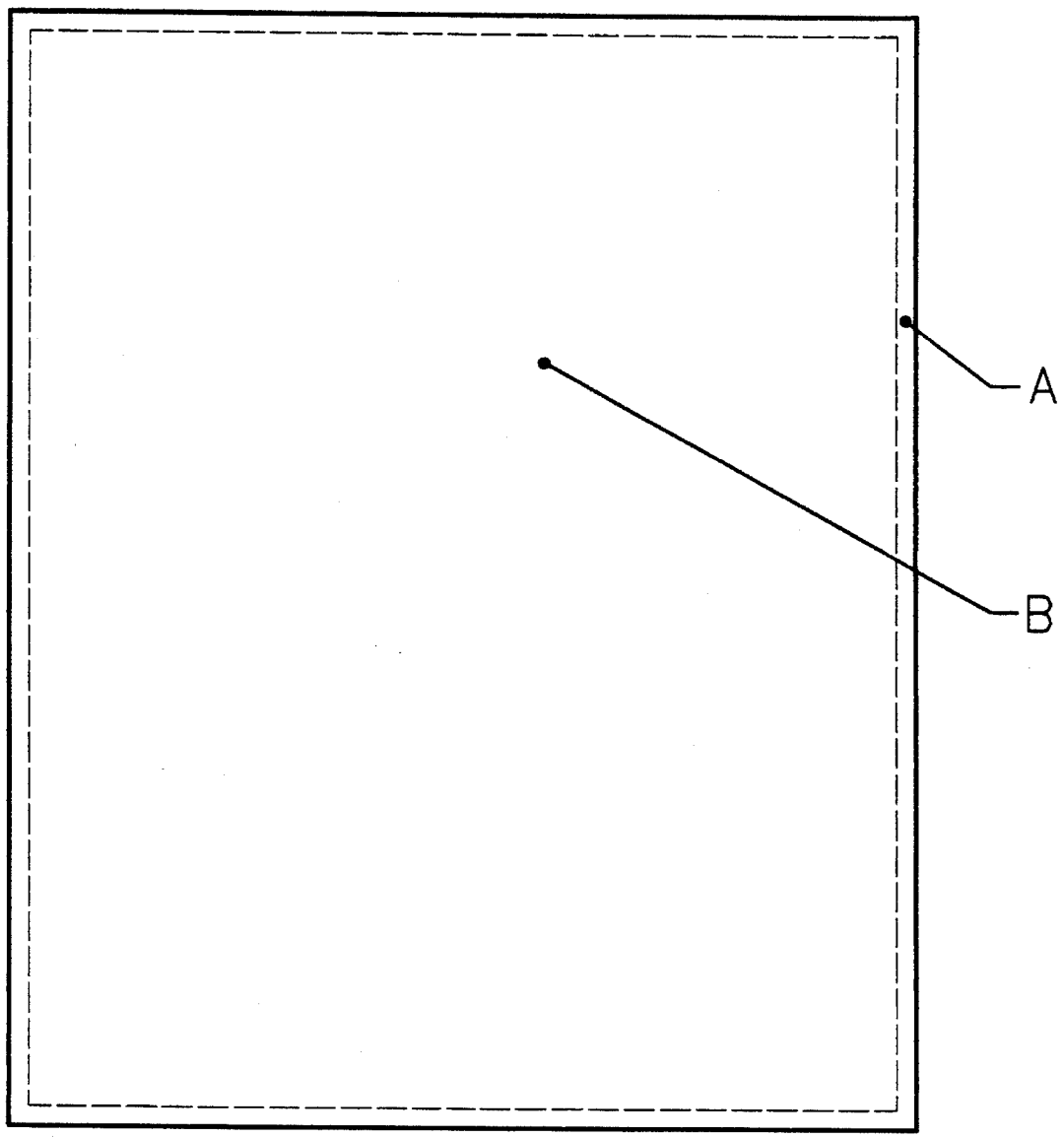
FIG. 4 is a front view of a single panel showing indicia carrier laminated between sheets of film.

It is expected that the primary use of this inventive concept will be with navigation charts used extensively by pilots, navigators, novices of small planes and small boats.

A small craft (boat) for the purposes of this invention is a vessel suitable for sailing on inland waters or at sea where a single individual both controls the rudder of the vessel and navigates the boat. Similarly, a small craft, plane, for flying on inland airwaves or over open water within sight of land is described where a single individual both controls the rudder and ailerons and navigates the plane.

A small craft navigates generally within sighting of land or land marks and typically a small craft is a vessel of which there is insufficient space for a navigating table. This would be especially true in the confined space of a small plane.

In addition small craft generally are not equipped with the latest electronic navigation devices. As a result of the aforementioned, small craft pilots and navigators rely on the available rolled paper or rolled laminated navigation charts. The use of these in a confined area and during turbulent, inclement weather conditions could render this present day rolled chart as impractical. The attempt by a pilot or navigator to roll this chart would be time consuming, awkward, cumbersome, frustrating, and would seriously compromise standard safety procedures. This could result in major navigation inaccuracies and possible loss of life.

For purposes of explanation and ease of understanding the specification contiguous will mean "edges of said panels are close but not touching." This clearance between panels allows for the unhampered epicycle multiplicity freedom of folding of panels necessary for the success of said navigation chart.

For purposes of explanation and ease of understanding the specification epicycle movement will mean that "any individual panel will have a slight linear movement at the small radii which will allow freedom of folding of said panel." In addition, the center of the large radii of each panel is located on the small radius at the hinged connection of said panels.

For the purposes of this invention talcum powder is defined as "super fine approximately 400 mesh powder being hydrated magnesium silicate."

Each individual rectangular panel consists of standard copy paper approximately 8½ inches horizontal dimension by 11 inches vertical dimension laminated between sheets of transparent film. Overall dimensions of said laminated epicycle multiplicity folding navigational chart being approximately 45½ inches horizontal dimension and 23⅛ inches vertical dimension and ⅟₃₀ inches height dimension in a full opened position. Overall dimension of said laminated epicycle multiplicity folding navigational chart being approximately 9 inches horizontal dimension by 11½ inches vertical dimension and ⅓ inches height dimension in a closed one panel position.

GENERAL DESCRIPTION OF FOLDING

Each panel may be folded over a contiguous panel through an epicycle motion vertical or horizontal relative to each other. The said chart may be in a combination of fully open to fully closed positions.

While it is recently known and acknowledged that large charts, maps, or indicia carriers could be laminated in panels and each of these panels could be hingedly connected to comprise a completed folding indicia carrier, it is not known that a hinged connection for a navigation chart is generally accepted or is currently in common use.

It is appreciated that various modifications to the inventive concepts may be apparent to those skilled in the art without departing from the spirit and scope of this invention.

I claim:

1. A laminated epicycle folding navigation chart consisting in combination of at least a first, second, third, fourth, fifth, sixth, seventh, eighth, ninth, and tenth relatively thin, rigid, resilient panels of a nearly rectangular configuration; said panels are aligned in a combination of at least two rows of five panels each; the first top row consisting of from left to right a first, second, third, fourth, and fifth panel; the second bottom row consisting of from left to right a sixth, seventh, eighth, ninth, and tenth panel; each panel consists of first and second nearly even parallel horizontal lateral edges of approximately equal length and first and second vertical major edges of approximately equal length; each of these panels includes navigation datum located on the front and back surfaces of said panel; each panel consisting of a fraction navigation datum sheet enveloped by transparent sheets of film laminated to each datum sheet; said panels are joined by flexible transparent couplings of approximately the full length of the horizontal lateral edge and of approximately the full length of the vertical major edge; said first flexible transparent coupling connecting said top row first left end panel second vertical edge to said top row second left panel first vertical edge; a said second flexible transparent coupling connecting said top row second left panel second vertical edge to said top row third middle panel first vertical edge; a said third flexible transparent coupling connecting said top row third middle panel second vertical edge to said top row fourth right panel first vertical edge; a said fourth flexible transparent coupling connecting said top row fourth right panel second vertical edge to said top row fifth right end panel first vertical edge; a said fifth flexible transparent coupling connecting said bottom row sixth end left panel second vertical edge to said bottom row seventh left panel first vertical edge; a said sixth flexible transparent coupling connecting said bottom row seventh left panel second vertical edge to said bottom row eighth middle panel first vertical edge; a said seventh flexible transparent coupling connecting said bottom row eighth middle panel second vertical edge to said bottom row ninth right panel first vertical edge; a said eighth flexible transparent coupling connecting said bottom row ninth right panel second vertical edge to said bottom row tenth right end panel first vertical edge; a said ninth flexible transparent coupling connecting said bottom row sixth left end panel top lateral horizontal edge to said top row first left end panel bottom lateral horizontal edge; a said tenth flexible transparent coupling connecting said bottom row seventh left panel top lateral horizontal edge to said top row second left panel bottom lateral horizontal edge; a said eleventh flexible transparent coupling connecting said bottom row eighth middle panel top lateral horizontal edge to said top row third middle panel bottom lateral horizontal edge; a said twelfth flexible transparent coupling connecting said bottom row ninth right panel top lateral horizontal edge to said top row fourth right panel bottom lateral horizontal edge; a said thirteenth flexible transparent coupling connecting said bottom row tenth right end panel top lateral horizontal edge to said top row fifth right end panel bottom lateral horizontal edge; said panels are reinforced at their junctions with alignment flexible transparent couplings; said couplings being of sufficient length to superimpose over the junctions and be overlapping; said first horizontal alignment flexible transparent coupling connecting said top row first left end panel top right corner to the said top row second left panel top left corner; a said second horizontal alignment flexible transparent coupling connecting said top row second left panel top right corner to the said top row third middle panel top left corner; a said third horizontal alignment flexible transparent coupling connecting said top row third middle panel top right corner to the said top row fourth right panel top left corner; a said fourth horizontal alignment flexible transparent coupling connecting said top row fourth right panel top right corner to the said top row fifth right end panel top left corner; a said fifth horizontal alignment flexible transparent coupling connecting the said top row first left end panel bottom right corner to the said top row second left panel bottom left corner and connecting the said bottom row sixth left end panel top right corner to the said bottom row seventh left panel top left corner; a said sixth horizontal alignment flexible transparent coupling connecting the said top row second left panel bottom right corner to the said top row third middle panel bottom left corner and connecting the said bottom row seventh left panel top right corner to the said bottom row eighth middle panel top left corner; a said seventh horizontal alignment flexible transparent coupling connecting the said top row third middle panel bottom right corner to the said top row fourth right panel bottom left corner and connecting the said bottom row eighth middle panel top right corner to the said bottom row ninth right panel top left corner; a said eighth horizontal alignment flexible transparent coupling connecting the said top row fourth right panel bottom right corner to the said top row fifth right end panel bottom left corner and connecting the said bottom row ninth right panel top right corner to the said bottom row tenth right end panel top left corner; a said ninth horizontal alignment flexible transparent coupling connecting the said bottom row sixth left end panel bottom right corner to the said bottom row seventh left panel bottom left corner; a said tenth horizontal alignment flexible transparent coupling connecting said bottom row seventh left panel bottom right corner to said bottom row eighth middle panel bottom left corner; a said eleventh horizontal alignment flexible transparent coupling connecting said bottom row eighth middle panel bottom right corner to said bottom row ninth right panel bottom left corner; a said twelfth horizontal alignment flexible transparent coupling connecting said bottom row ninth right panel bottom right corner to said bottom row tenth right end panel bottom left corner; a said thirteenth vertical alignment flexible transparent coupling connecting the said bottom row sixth left end panel top left corner to the top row first left end panel bottom left corner; a said fourteenth vertical alignment flexible transparent coupling connecting said bottom row tenth right end panel top right corner to the top row fifth right end panel bottom right corner; and said first, sixth conjugate panels being pivotal vertically may be folded vertically over either face of said second, seventh conjugate panels and said panels may be folded vertically over either face of said third, eighth conjugate panels and said panels may be folded vertically over either face of said fourth, ninth conjugate panels and said panels may be folded vertically over either face of fifth, tenth conjugate panels whereby said conjugate panels may be folded vertically in a clockwise, counter clockwise, or alternate rotation or may be folded vertically over any pair of other said conjugate panels in a random rotation; and said first, second, third, fourth, fifth, conjugate panels may be folded horizontally over either face of said sixth, seventh, eighth, ninth, tenth conjugate panels; and any pair of said conjugate panels may be folded horizontally over remaining conjugate panels, while the chart is in a full opened position, partially closed or fully closed position, allowing any one panel face of ten panels comprising 20 faces to be easily visible to the observer.

2. In a laminated epicycle folding navigation chart as in claim 1, wherein said flexible transparent couplings being defined as monofilament nylon strapping tape.

3. In a laminated epicycle folding navigation chart as in claim 1, wherein said flexible transparent couplings being defined as monofilament nylon strands equally spaced parallel and enveloped by polyester with adhesive backing.

4. In a laminated epicycle folding navigation chart as in claim 1, wherein said flexible transparent couplings being defined as transparent woven glass yarn encased in transparent polyester or transparent polypropolene flexible plastic and backed with natural rubber adhesive or synthetic rubber adhesive.

5. In a laminated epicycle folding navigation chart as in claim 1, wherein said flexible transparent couplings being defined as any of a series of state of the art transparent flexible strapping tape as in common use.

6. In a laminated epicycle folding navigation chart as in claim 1, wherein said flexible transparent couplings being defined as standard transparent strapping tape which is comprised of a plurality of width and length dimensions; said transparent strapping tape being approximately ¾ inch width dimension of approximately 100 yards in rolled length and approximately a few thousandths inch thick.

7. In a laminated epicycle folding navigation chart as in claim 1, wherein said flexible coupling comprises: a standard transparent strapping tape with talcum powder applied to the exposed adhesive to allow freedom of folding.

8. In a laminated epicycle folding navigation chart as in claim 1, wherein said chart containing at least a plurality of 10 contiguous parallel panels, each panel separated at its contiguous edges by a clearance equal to approximately the height dimension of a single panel; said panels are assembled in a fixture that controls line-to-line parallel positioning of the 10 panels relative to each other.

9. In a laminated epicycle folding navigation chart as in claim 1, wherein said chart is waterproof and has a specific gravity approximately less than the specific gravity of water allowing floatation in fresh or sea water.

10. In a laminated epicycle folding navigation chart as in claim 1, wherein said panels comprised of standard copy paper being a fraction navigation datum sheet of said navigation chart laminated between transparent polyester coated with a heat activated copolymer transparent film.

11. In a laminated epicycle folding navigation chart as in claim 1, epicycle folding being defined as the slight lateral movement of the flexible coupling providing nearly 360° rotation.

* * * * *